(12) United States Patent
Pal et al.

(10) Patent No.: US 12,455,091 B2
(45) Date of Patent: Oct. 28, 2025

(54) SYSTEMS AND METHODS FOR PREDICTING OCCUPANCY FOR ONE BUILDING USING A MODEL TRAINED AT ANOTHER BUILDING

(71) Applicant: Honeywell International Inc., Charlotte, NC (US)

(72) Inventors: Rohil Pal, Lal Bangla Kanpur (IN); Navneet Kumar, Gurgaon (IN); Deepika Sandeep, Bangalore (IN); Prabhat Ranjan, Bangalore (IN); Bhavesh Gupta, Niantic, CT (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 495 days.

(21) Appl. No.: 17/949,331

(22) Filed: Sep. 21, 2022

(65) Prior Publication Data

US 2024/0093901 A1   Mar. 21, 2024

(51) Int. Cl.
*F24F 11/64* (2018.01)
*F24F 110/10* (2018.01)
(Continued)

(52) U.S. Cl.
CPC ........... *F24F 11/64* (2018.01); *F24F 2110/10* (2018.01); *F24F 2110/64* (2018.01);
(Continued)

(58) Field of Classification Search
CPC .... F24F 11/64; F24F 2110/10; F24F 2110/64; F24F 2110/66; F24F 2110/70;
(Continued)

(56) References Cited

U.S. PATENT DOCUMENTS 10,353,355 B2   7/2019   Sawada et al.
10,678,416 B2   6/2020   Fadell et al.
(Continued)

FOREIGN PATENT DOCUMENTS

KR   101917375 B1   5/2018

OTHER PUBLICATIONS

Dridi, J., Amayri, M. and Bouguila, N., 2022. Transfer learning for estimating occupancy and recognizing activities in smart buildings. Building and Environment, 217, p. 109057. (Year: 2022).*
(Continued)

*Primary Examiner* — Alicia M. Choi
(74) *Attorney, Agent, or Firm* — Seager, Tufte & Wickhem, LLP (57) ABSTRACT

A Building Management System (BMS) may be controlled in accordance with predicted occupancy using a trained model. A model is trained by providing the model with time stamped environmental data and corresponding time stamped occupancy data pertaining to a training building, wherein the time stamped environmental data is derived from one or more environmental sensors of the training building and the corresponding time stamped occupancy data is derived from one or more occupancy sensors of the training building. Once trained, the trained model is provided with time stamped environmental data for a use building that is derived from one or more environmental sensors of the use building. The trained model outputs a predicted occupancy value that represents a predicted occupancy count in the use building, and the BMS of the use building is controlled based at least in part on the predicted occupancy value.

12 Claims, 7 Drawing Sheets

(51) Int. Cl.
  *F24F 110/64* (2018.01)
  *F24F 110/66* (2018.01)
  *F24F 110/70* (2018.01)
  *F24F 120/10* (2018.01)

(52) U.S. Cl.
  CPC ....... *F24F 2110/66* (2018.01); *F24F 2110/70* (2018.01); *F24F 2120/10* (2018.01)

(58) Field of Classification Search
  CPC ............... F24F 2120/10; F24F 2110/12; F24F 2110/20; F24F 2110/22; F24F 11/62; F24F 11/46; G06N 5/01; G06N 7/01; G06N 20/20; G05B 2219/25011; G05B 15/02; G05B 2219/2642; G06Q 10/04; G06Q 50/06
  See application file for complete search history.

(56) References Cited

U.S. PATENT DOCUMENTS

| | | | |
|---|---|---|---|
| 11,402,116 B2 | 8/2022 | Papadopoulos et al. | |
| 2007/0056299 A1* | 3/2007 | Shankweiler | G05D 23/32 62/157 |
| 2014/0277765 A1* | 9/2014 | Karimi | G05B 15/02 700/276 |
| 2017/0323208 A1* | 11/2017 | Al-Mohssen | G06F 30/20 |
| 2018/0011463 A1* | 1/2018 | Chowdhury | G05B 19/0428 |
| 2018/0248370 A1* | 8/2018 | Beheshti | G06Q 10/06 |
| 2019/0087696 A1 | 3/2019 | Verhoeven et al. | |
| 2019/0378020 A1 | 12/2019 | Camilus et al. | |
| 2021/0173969 A1* | 6/2021 | Abbey | G06F 30/13 |
| 2022/0221178 A1 | 7/2022 | Brahme et al. | |

OTHER PUBLICATIONS

Yang, Z., Li, N., Becerik-Gerber, B. and Orosz, M., 2014. A systematic approach to occupancy modeling in ambient sensor-rich buildings. Simulation, 90(8), pp. 960-977. (Year: 2014).*
Extended European Search Report, EP Application No. 23194886.0, European Patent Office, Feb. 21, 2024 (8 pages).
Patents Act 1977: Combined Search and Examination Report under Section 17 and 18(3), GB Application No. GB2312908.3, Intellectual Property Office, Feb. 26, 2024 (6 pages).
Adeogun et al., "Indoor Occupancy Detection and Estimation using Machine Learning and Measurements from an IoT LoRa-based Monitoring System," The Technolgy Library, UTC from IEEE Xplore, 5 pages, 2019, Accessed May 17, 2022.
Arief-Ang et al., "CD-HOC: Indoor Human Occupancy Counting using Carbon Dioxide Sensor Data," Elsevier, 24 pages, 2017.
Dutta et al., "OccupancySense: Context-based Indoor Occupancy Detection & Prediction using CatBoost Model," Science Direct, vol. 119, 3 pages, 2022, Accessed May 17, 2022.
Ling et al., "A Time-Aware Method for Occupancy Detection in a Building," MOBIMEDIA 2019, June 29-30, Weihai, People's Republic of China, 14 pages, 2019.
Vela et al.," Estimating Occupancy Levels in Enclosed Spaces Using Environmental Variables: A Fitness Gym and Living Room as Evaluation Scenarios, " Sensors, 21 pages, 2020.
Wang et al., "Occupancy Prediction Through Machine Learning and Data Fusion of the Environmental Sensing and Wi-Fi sensings in buildings," 31 pages, 2022.
Wikipedia, "Random Forest," https://en.wikipedia.org/wiki/Random_forest, 12 pages, 2022. Accessed Jul. 19, 2022.

* cited by examiner

┌──────────────────────────────────────┐ ─ 78
│ Storing a trained model that is trained to predict an occupancy count of a training building space in a
│ training building using time stamped environmental data and corresponding time stamped occupancy data
│ pertaining to the training building space in the training building, the training building space in the training
│ building serviced by an AHU of the training building, and wherein the training building space in the training
│ building has a training building space volume and the AHU of the training building has a load capacity
└──────────────────────────────────────┘
                    │
                    ▼
┌──────────────────────────────────────────────────────────────┐ ─ 80
│ Predicting an occupancy count of a use building space in a use building, wherein the use building is different from
│ the training building and the use building space in the use building is serviced by an AHU of the use building, and
│ wherein the use building space in the use building has a use building space volume and the AHU of the use
│ building has a load capacity, wherein predicting the occupancy count of the use building space includes:
│
│   ┌──────────────────────────────────────┐ ─ 80a
│   │ Providing to the trained model time stamped environmental data pertaining to
│   │ the use building space in the use building, wherein the trained model generates
│   │ a raw occupancy count value for the use building space in the use building
│   └──────────────────────────────────────┘
│                    │
│                    ▼
│   ┌──────────────────────────────────────┐ ─ 80b
│   │ Applying one or more normalization factors to the raw occupancy count
│   │ value to produce a predicted occupancy value for the use building space in
│   │ the use building, wherein the one or more normalization factors account for
│   │ one or more differences between the training building and the use building
│   └──────────────────────────────────────┘
└──────────────────────────────────────────────────────────────┘
```

SYSTEMS AND METHODS FOR PREDICTING OCCUPANCY FOR ONE BUILDING USING A MODEL TRAINED AT ANOTHER BUILDING

TECHNICAL FIELD

The present disclosure pertains to building control systems and more particularly to building control systems that control building systems in accordance with estimated occupancy values.

BACKGROUND

Building control systems such as but not limited to Heating, Ventilating and Air Conditioning (HVAC) systems, security systems, lighting systems, fire systems, water systems, energy distribution systems and/or any other building control systems may be configured to operate at least in part in accordance with occupancy values. For example, for an HVAC system, when building occupancy increases, there may be a desire to increase ventilation, for example, to maintain healthy building parameters, or to change temperature setpoints in order to maintain comfort for the occupants within the building. When building occupancy decreases, there may be a desire to decrease ventilation or to change temperature setpoints in order to save energy. Inclusion of occupancy sensors in order to determine occupancy can increase the costs and complexity of a building control system. Relying on access cards for occupancy data can be problematic in some situations. What would be desirable would be a method of using data from air quality sensors and/or other sensors already within a building to estimate a current occupancy count. What would be a desirable would be a method of training an occupancy estimation model using data from a training building, and be able to apply that model in a different use building.

SUMMARY

This disclosure relates to building control systems and more particularly to building control systems that control building systems in accordance with estimated occupancy values. An example may be found in a method for controlling one or more components of a Building Management System (BMS) of a use building in accordance with predicted occupancy of the use building, where the predicted occupancy is based upon a trained model. The illustrative method includes training the model by providing the model with time stamped environmental data and corresponding time stamped occupancy data pertaining to a training building that is different from the use building, wherein the time stamped environmental data is derived from one or more environmental sensors of the training building and the corresponding time stamped occupancy data is derived from one or more occupancy sensors of the training building. The model is trained over time using the time stamped environmental data and the corresponding time stamped occupancy data, resulting in a trained model. The trained model is then employed in the use building. Employing the trained model in the use building includes providing the trained model with time stamped environmental data pertaining to the use building, wherein the time stamped environmental data is derived from one or more environmental sensors of the use building. The trained model outputs a predicted occupancy value that represents a predicted current occupancy count in the use building. The illustrative method includes operating the BMS of the use building based at least in part on the predicted occupancy value.

Another example may be found in a method that includes storing a trained model that is trained to predict an occupancy count of a training building space in a training building using time stamped environmental data and corresponding time stamped occupancy data pertaining to the training building space in the training building. In this example, the training building space in the training building is serviced by an AHU of the training building. The training building space in the training building has a training building space volume and the AHU that services the training building has a load capacity. An occupancy count of a use building space in a use building is predicted, wherein the use building is different from the training building and the use building space in the use building is serviced by an AHU of the use building, and the use building space in the use building has a use building space volume and the AHU servicing the use building space of the use building has a load capacity. In this example, predicting the occupancy count of the use building space includes providing to the trained model time stamped environmental data pertaining to the use building space in the use building. The trained model generates a raw occupancy count value for the use building space in the use building, and applies one or more normalization factors to the raw occupancy count value to produce a predicted occupancy count value for the use building space in the use building. The one or more normalization factors may account for one or more differences between the training building and the use building. For example, the one or more normalization factors may account for the differences between the building space volume and/or the AHU load capacity of the training building space relative to the use building space.

Another example may be found in a non-transitory, computer-readable storage medium having executable instructions stored thereon. When the executable instructions are executed by one or more processors, the one or more processors are caused to access a trained model that is trained to predict an occupancy count of a training building space in a training building using time stamped environmental data and corresponding time stamped occupancy data pertaining to the training building space in the training building. The training building space in the training building is serviced by an AHU of the training building. The training building space has a training building space volume and the AHU servicing the training building space has a load capacity. The one or more processors are caused to receive time stamped environmental data pertaining to a use building space in a use building, wherein the use building is different from the training building. The one or more processors are caused to predict an occupancy count of the use building space in the use building, wherein the use building space in the use building is serviced by an AHU of the use building. The use building space in the use building has a use building space volume and the AHU servicing the use building space has a load capacity. In this example, predicting the occupancy count of the use building space includes providing to the trained model the time stamped environmental data pertaining to the use building space in the use building, and in response, the trained model generates a raw occupancy count value for the use building space in the use building, and applies one or more normalization factors to the raw occupancy count value to produce a predicted occupancy value for the use building space in the use building. The one or more normalization factors may account for one or more differences between the training building and the use building. For example, the one or more normalization factors may account for the differences between the building space volume and/or the AHU load capacity of the training building space relative to the use building space.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 6 is a flow diagram showing an illustrative method.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
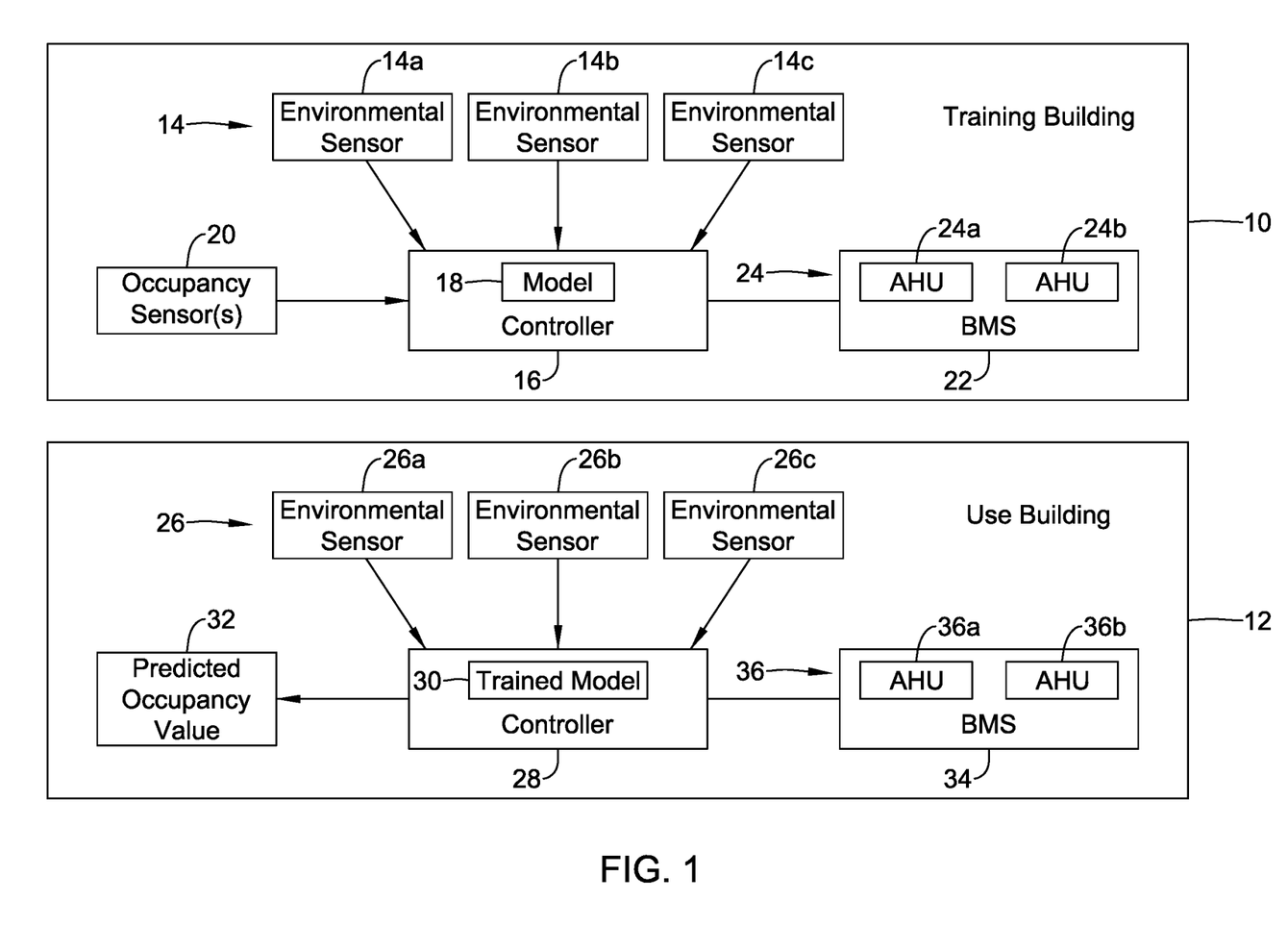
FIG. 1 is a schematic block diagram showing a training building used to train a model and a use building in which the trained model is deployed to predict an occupancy count in the use building.

FIG. 1 is a schematic block diagram of an illustrative training building 10 and an illustrative use building 12. The training building 10 may be used to train a model for predicting occupancy based on, for example, one or more environmental parameter values and one or more occupancy sensors. The model, once trained, may be used within the use building 12 to predict occupancy within the use building 12 based on one or more environmental parameter values. Occupancy sensors in the use building are not required. In some cases, as will be discussed, the predicted occupancy as predicted by the trained model may be modified by one or more normalization factors to account for differences between the training building 10 and the use building 12. While a single use building 12 is shown, it will be appreciated that the trained model, possibly with the appropriate normalization factors, may be used to predict occupancy based on the values of various environmental parameters in any of a variety of different use buildings 12 without requiring occupancy sensors in the use buildings 12.

The training building 10 includes a single environmental sensor 14, several environmental sensors 14, or a large number of environmental sensors 14, depending for example on the size and layout of the training building 10. Example environmental sensors 14 are individually labeled as 14a, 14b and 14c in FIG. 1. While a total of three environmental sensors 14 are shown in FIG. 1, it will be appreciated that this is merely illustrative, as the training building 10 may include any number of environmental sensors 14. The environmental sensors 14 may be operably coupled with a controller 16 and provide the controller 16 with environmental parameter values that are affected by occupancy and that can be used by the controller 16 in training a model 18. Examples of environmental sensors 14 that may be included in the training building 10 include but are not limited to indoor carbon dioxide sensors, indoor temperature sensors, indoor humidity sensors, indoor PM2.5 particulate matter sensors, and indoor TVOC (total volatile organic compound) sensors. Additional examples of environmental sensors 14 that may be included in the training building 10 include but are not limited to outdoor carbon dioxide sensors, outdoor temperature sensors, outdoor humidity sensors, outdoor PM2.5 particulate matter sensors, and outdoor TVOC (total volatile organic compound) sensors.

The training building 10 may also include a single occupancy sensor 20, several occupancy sensors 20, or a large number of occupancy sensors 20, depending for example on the size and layout of the training building 10. The occupancy sensors 20 may be operably coupled with the controller 16 and provide the controller 16 with actual detected occupancy values that can be used by the controller 16 in training the model 18. The one or more occupancy sensors 20 may include any of a variety of different types of occupancy sensors 20. For example, the occupancy sensors 20 may include an access card reader that requires each person entering a space to proffer their access card to the access card reader. In some cases, the occupancy sensors 20 may include motion sensors such as but not limited to PIR (passive infrared) sensors. In some cases, one or more motion sensors may be part of a lighting system of the training building 10 that detect motion in the training building 10 and in response automatically activates lights. In some cases, the occupancy sensors 20 may include one or more wireless access points (e.g. Wifi, Bluetooth, etc.) that automatically connect to one or more mobile devices (mobile phone, RFID card, etc.) carried by occupants of the building. The wireless access points may identify how many occupant devices are connected to the wireless access point, and thus the number of occupants that are present in the corresponding building space. In some cases, the occupancy sensors 20 may represent the results of video analytics performed on a captured video stream to detect people in that manner. These are just examples.

The environmental sensors 14 within the training building 10 provide signals representative of various environmental parameters to the controller 16. The controller 16 may be part of a computer such as a desktop computer or a laptop computer, for example. The controller 16 may be part of a computer server such as a cloud-based server. The controller 16 includes or is configured to train the model 18. Once trained, the model 18 may be used to predict occupancy in the use building 12, for example. The model 18 may be trained using any of a variety of machine learning algorithms. In some cases, the model 18 may be trained using any of a variety of different regression algorithms. In some cases, the model 18 may trained using a random forest regressor model.

In some cases, the training building 10 includes a BMS (building management system) 22. In the example shown, the BMS 22 includes several AHU (air handling units) 24, individually labeled as 24a and 24b. The BMS 22 may have particular parameters that influence the trained model 18, including for example load capacity values for each of the AHUs 24. The load capacity values may be expressed in BTU's or other suitable measure of load capacity. Each AHU may service a corresponding building space in the training building. The BMS 22 may store a volume of the building space serviced by each AHU as a parameter that influences the trained model 18.

The use building 12 includes a single environmental sensor 26, several environmental sensors 26, or a large number of environmental sensors 26, depending for example on the size and layout of the use building 12. Example environmental sensors 26 are individually labeled as 26a, 26b and 26c in FIG. 1. While a total of three environmental sensors 26 are shown in FIG. 1, it will be appreciated that this is merely illustrative, as the use building 12 may include any number of environmental sensors 26. The environmental sensors 26 may be operably coupled with a controller 28 and provide the controller 28 with environmental parameter values that are affected by occupancy and that can be used by the controller 16 to predict an occupancy count of the use building 12. Examples of environmental sensors 26 that may be included in the use building 12 include but are not limited to indoor carbon dioxide sensors, indoor temperature sensors, indoor humidity sensors, indoor PM2.5 particulate matter sensors, and indoor TVOC (total volatile organic compound) sensors. Additional examples of environmental sensors 26 that may be included in the use building 12 include but are not limited to outdoor carbon dioxide sensors, outdoor temperature sensors, outdoor humidity sensors, outdoor PM2.5 particulate matter sensors, and outdoor TVOC (total volatile organic compound) sensors.

The environmental sensors 26 within the use building 12 provide signals representative of various environmental parameters to the controller 28. The controller 28 may be part of a computer such as a desktop computer or a laptop computer, for example. The controller 28 may be part of a computer server such as a cloud-based server. The controller 28 is configured to provide sensor data to a trained model 30. Once the model 18 is trained at the training building 10, the trained model 18 is saved as the trained model 30 for use with the use building 12. Based on the environmental information provided to the trained model 30, and without use of occupancy sensors in the use building, the trained model 30 outputs a predicted occupancy count value 32 in the use building 12. The predicted occupancy count value 32 may be used at least in part to control operation of a BMS (building management system) 34 of the use building 12. The BMS 34 may include several AHU (air handling units) 36. In some cases, size and capacity differences between the BMS 22 of the training building 10, including the AHUs 24, and the BMS 34 of the use building 12, including the AHUs 36, may be part of a normalization to normalize the predicted occupancy count value 32 for the particular use building 12. For example, one or more normalization factors may account for one or more differences between the training building 10 and the use building 12. For example, one or more normalization factors may account for the differences between the building space volume and/or the AHU load capacity of the training building space relative to the use building space. Normalization may increase the accuracy of the predicted occupancy count value 32 provided by the trained model 30.

Figure 2:
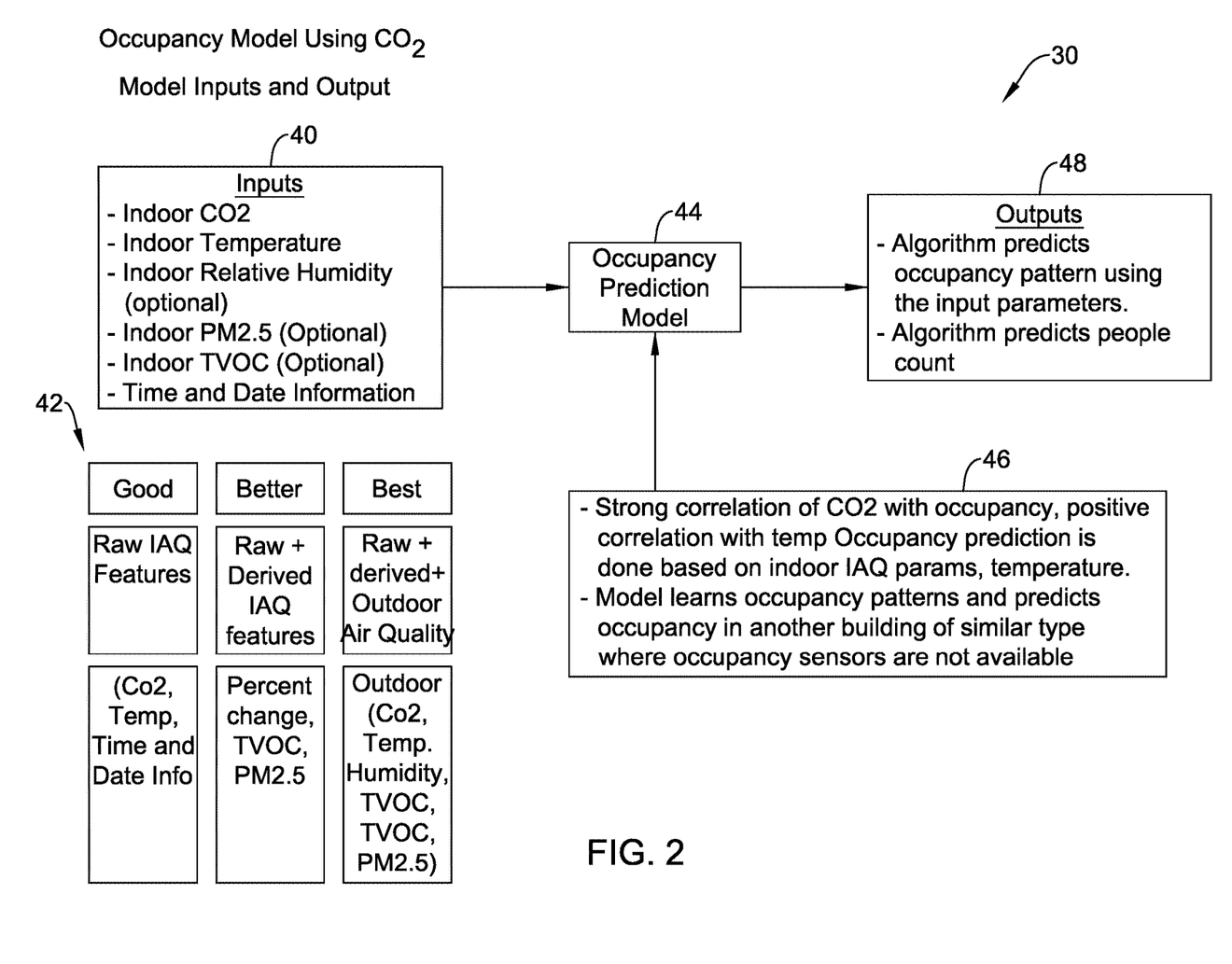
FIG. 2 is a schematic block diagram showing an illustrative set of inputs and outputs for use of the trained model in the use building.

FIG. 2 is a schematic block diagram showing an illustrative set 38 of inputs and outputs for use of a trained model 30. The illustrative set 38 includes a number of inputs 40 that include some of the same environmental parameters referenced with respect to the environmental sensors 14. In some cases, a large number of different inputs 40 may be used. In some cases, only a few inputs 40 may be used. A block 42 provides a Good list, a Better list and a Best list. In the Good list are raw IAQ (indoor air quality) values such as carbon dioxide, temperature, and date/time. In the Better list are each of those from the Good list, and the Better list further includes derived IAQ values such as percentage change in one of the IAQ parameters during a sample period, TVOC (total volatile organic compounds) and PM2.5 particulate matter. The Best list includes all of those, and also adds outdoor environmental parameters. In some cases, if carbon dioxide concentration is used, good results can be obtained simply by using carbon dioxide concentration, temperature and date/time information.

The inputs 40 are provided to an occupancy prediction model 44, which may be considered as being an example of the trained model 30. As indicated at block 46, there is a strong correlation between carbon dioxide concentration and occupancy and a positive correlation between temperature and occupancy. The occupancy prediction model 44 provides outputs 48. The outputs 48 include a predicted occupancy pattern for the use building, including predicted people count (e.g. 4 people, 10 people, etc.). The BMS 34 of the use building 12 may be operated in accordance with the predicted occupancy provided by the occupancy prediction model 44. For example, outside air ventilation may be increased as the predicted people count increases, and/or outside air ventilation may be decreased as the predicted people count decreases (e.g. to save heating/cooling costs).

Figure 3:
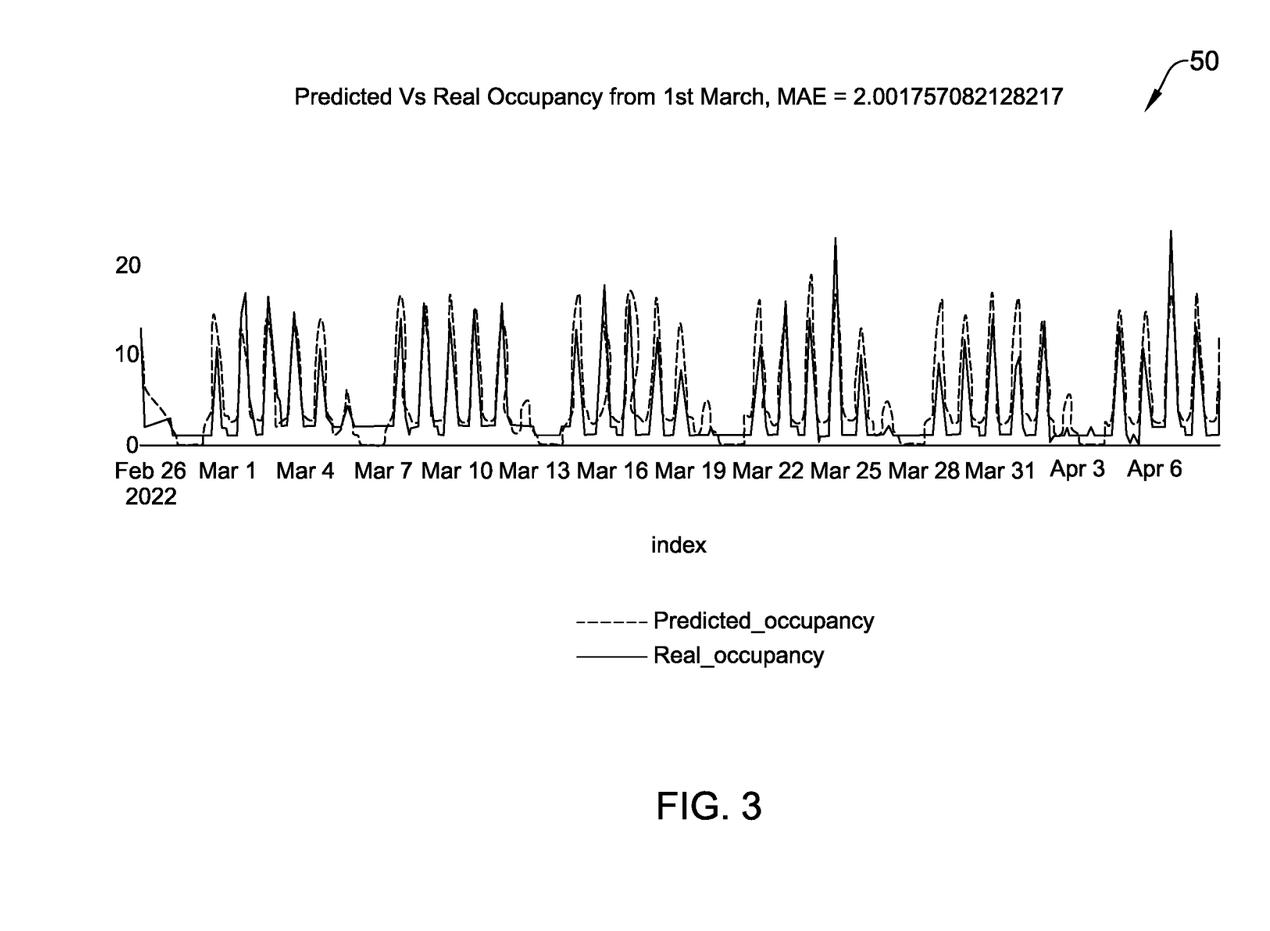
FIG. 3 is a graphical representation of predicted occupancy of a use building over time as predicted by a trained model along with the actual occupancy values of the use building.

FIG. 3 is a graphical representation 50 of predicted occupancy of the use building 12 over time as predicted by a trained model 30 along with the actual occupancy values of the use building 12. As can be seen, there is good correlation between the predicted occupancy and the real occupancy. This was achieved using just carbon dioxide concentration, temperature data and date/time information. In some cases, the trained model 30 predicts occupancy at the AHU level of the use building, and the occupancy prediction for each AHU (or the space serviced by each AHU) may be aggregated to obtain a floor level occupancy prediction.

Occupancy predictions can be made without having access to carbon dioxide concentrations. For example, a particular building may not have carbon dioxide sensors, or parts of a particular building may lack carbon dioxide sensors. In some cases, the model 18 can be trained and used with a variety of other environmental parameter values. In an example, the model may be trained in the training building 10 using outside air temperature, outside air humidity, return air temperature, return air humidity, supply air temperature, supply air humidity, supply static pressure and/or supply temperature setpoint. While this is a greater set of parameters than is necessary when carbon dioxide concentration is available to the model, it can produce useful results.

Figure 4:
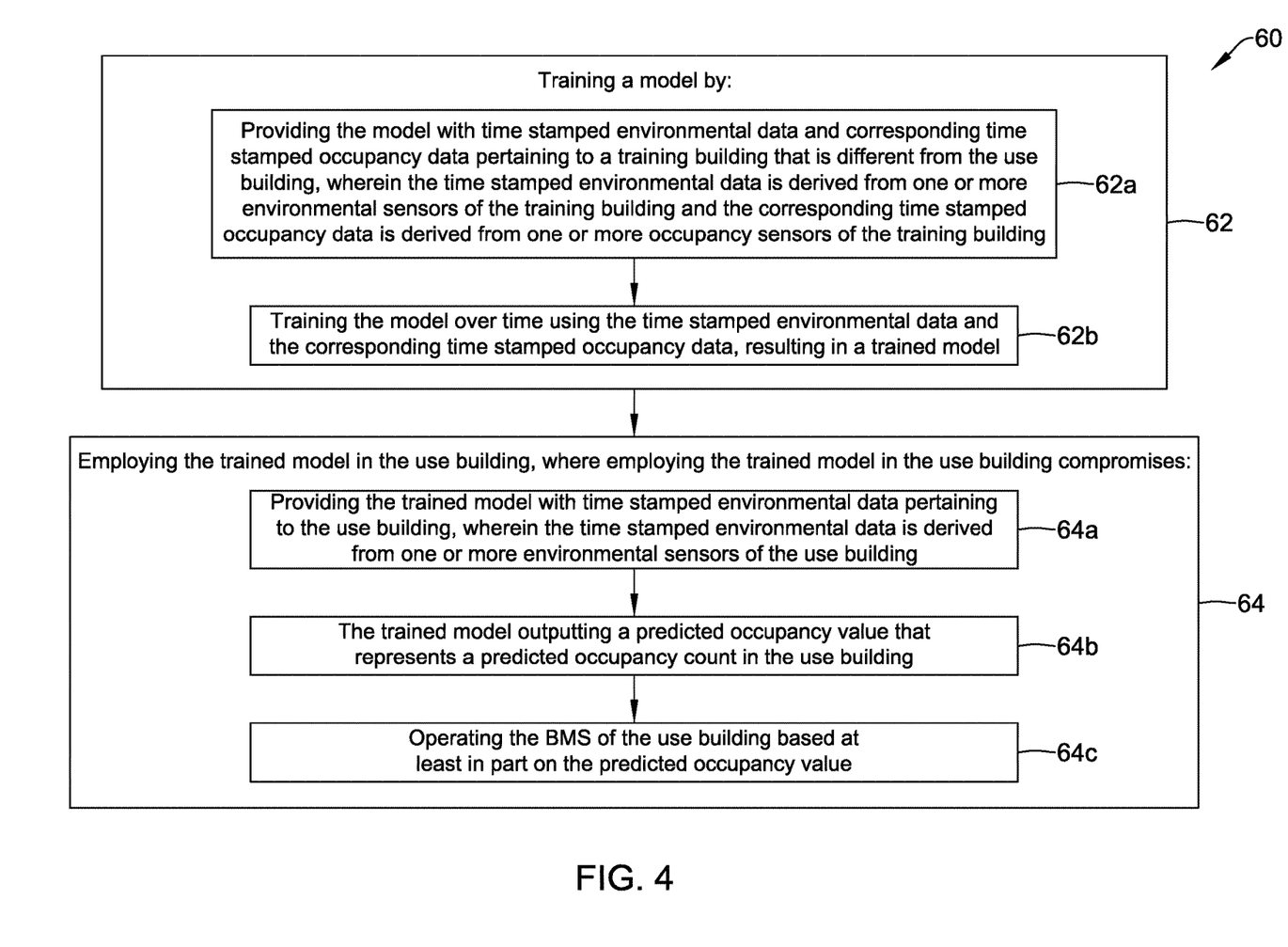
FIG. 4 is a flow diagram showing an illustrative method.

FIG. 4 is a flow diagram showing an illustrative method 60 for controlling one or more components of a Building Management System (BMS) (such as the BMS 34) of a use building (such as the use building 12) in accordance with predicted occupancy of the use building. The predicted occupancy is based upon a trained model (such as the trained model 30). The includes training a model, as indicated at block 62. In this example, training the model includes providing the model with time stamped environmental data and corresponding time stamped occupancy data pertaining to a training building that is different from the use building, wherein the time stamped environmental data is derived from one or more environmental sensors of the training building and the corresponding time stamped occupancy data is derived from one or more occupancy sensors of the training building, as indicated at block 62a. Training the model includes training the model over time using the time stamped environmental data and the corresponding time stamped occupancy data, resulting in a trained model, as indicated at block 62b. The model (such as model 18) may be trained using, for example, any of a variety of machine learning algorithms. In some cases, the model may be trained using any of a variety of different regression algorithms. In some cases, the model may trained using a random forest regressor algorithm.

The illustrative method 60 includes employing the trained model in the use building, as indicated at block 64. Employing the trained model in the use building includes providing the trained model with time stamped environmental data pertaining to the use building, wherein the time stamped environmental data is derived from one or more environmental sensors of the use building, as indicated at block 64a. Employing the trained model in the use building includes the trained model outputting a predicted occupancy value that represents a predicted occupancy count in the use building, as indicated at block 64b, without the use of occupancy sensors in the use building. Employing the trained model in the use building includes operating the BMS of the use building based at least in part on the predicted occupancy value, as indicated at block 64c.

In some cases, employing the trained model includes receiving a raw occupancy count value produced by the trained model, and applying one or more normalization factors to the raw occupancy count value to produce the predicted occupancy value, wherein the one or more normalization factors account for one or more differences between the training building and the use building. As an example, the one or more normalization factors may account for one or more of volumetric differences between the training building and the use building, and/or maximum occupancy count differences between the training building and the use building. In some cases, the BMS of the use building and a BMS of the training building each have one or more Air handler Units (AHUs), and wherein one or more normalization factors account for differences in a load capacity between one or more of the AHUs of the training building and the use building. One or more normalization factors may account for differences in volume of the spaces serviced by the AHUs of the training building and the use building.

In some cases, the model may be trained using regression machine learning. The time stamped environmental data may include two or more of an indoor $CO_2$ concentration, an indoor temperature, a fresh air intake flow rate of an AHU of the BMS, an indoor humidity, an indoor Total Volatile Organic compounds (TVOC), and an indoor Particulate Matter 2.5 (PM2.5). This may refer to the time stamped environmental data provided to the model during training within the training building 10 and/or during use of the trained model in the use building 12. The time stamped environmental data may additionally or alternatively include one or more of an outdoor $CO_2$ concentration, an outdoor temperature, an outdoor humidity, an outdoor Total Volatile Organic compounds (TVOC), and an outdoor Particulate Matter 2.5 (PM2.5). As another example, the time stamped environmental data may include two or more of outside air temperature, outside humidity, return air temperature, return air humidity, supply air temperature, supply air humidity, supply air static pressure and supply temperature setpoint.

Figure 5:
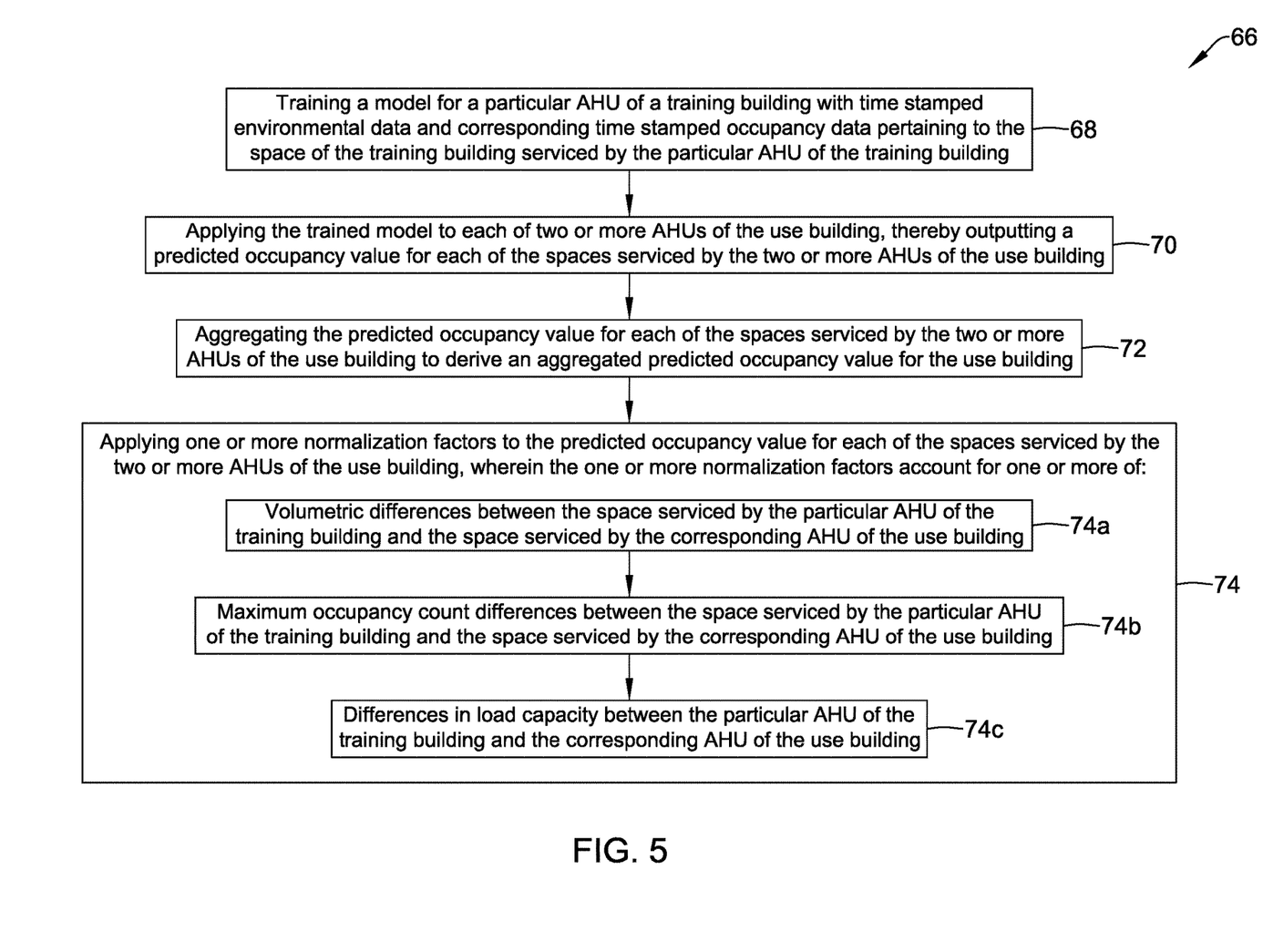
FIG. 5 is a flow diagram showing an illustrative method.

FIG. 5 is a flow diagram showing an illustrative method 66 for controlling one or more components of a Building Management System (BMS) (such as the BMS 34) of a use building (such as the use building 12) in accordance with a predicted occupancy of the use building. The predicted occupancy is based upon a trained model (such as the trained model 30), where the BMS of the use building and a BMS of the training building each have one or more AHUs (air handling units) servicing a corresponding space. The illustrative method 66 includes training the model for a particular AHU of the training building with the time stamped environmental data and the corresponding time stamped occupancy data pertaining to the space of the training building serviced by the particular AHU of the training building, as indicated at block 68. The trained model is then applied to each of two or more AHUs of the use building, thereby outputting a predicted occupancy value for each of the spaces serviced by the two or more AHUs of the use building, as indicated at block 70. The predicted occupancy value for each of the spaces serviced by the two or more AHUs of the use building are aggregated to derive an aggregated predicted occupancy value for the use building, as indicated at block 72.

In some cases, the method 66 includes applying one or more normalization factors to the predicted occupancy value for each of the spaces serviced by the two or more AHUs of the use building, as indicated at block 74. The one or more normalization factors may account for volumetric differences between the space serviced by the particular AHU of the training building and the space serviced by the corresponding AHU of the use building, as indicated at block 74a. The one or more normalization factors may account for maximum occupancy count differences between the space serviced by the particular AHU of the training building and the space serviced by the corresponding AHU of the use building, as indicated at block 74b. The one or more normalization factors may account for differences in load capacity between the particular AHU of the training building and the corresponding AHU of the use building, as indicated at block 74c. These are just examples.

FIG. 6 is a flow diagram showing an illustrative method 76 that includes storing a trained model that is trained to predict an occupancy count of a training building space in a training building using time stamped environmental data and corresponding time stamped occupancy data pertaining to the training building space in the training building. The training building space in the training building is serviced by an AHU of the training building, and wherein the training building space in the training building has a training building space volume and the AHU of the training building has a load capacity, as indicated at block 78. The illustrative method 76 includes predicting an occupancy count of a use building space in a use building, wherein the use building is different from the training building and the use building space in the use building is serviced by an AHU of the use building. The use building space in the use building has a use building space volume and the AHU of the use building has a load capacity, as indicated at block 80.

Predicting the occupancy count of the use building space may include providing to the trained model time stamped environmental data pertaining to the use building space in the use building, wherein the trained model generates a raw occupancy count value for the use building space in the use building, as indicated at block 80a. Predicting the occupancy count of the use building space may include applying one or more normalization factors to the raw occupancy count value to produce a predicted occupancy value for the use building space in the use building, wherein the one or more normalization factors account for one or more differences between the training building and the use building, as indicated at block 80b.

In some cases, the one or more normalization factors account for differences between the training building space volume of the training building space in the training building and the use building space volume of the use building space in the use building. In some cases, the one or more normalization factors may account for maximum occupancy count differences between the training building space in the training building and the use building space in the use building. The one or more normalization factors may account for differences in the load capacity of the AHU servicing the training building space in the training building and the load capacity of the AHU servicing the use building space in the use building. These are just examples.

In some instances, the time stamped environmental data provided to the trained model pertaining to the use building space in the use building may include two or more of an indoor $CO_2$ concentration in the use building space of the use building, an indoor temperature in the use building space of the use building, a fresh air intake flow rate of the AHU of the use building space of the use building, an indoor humidity in the use building space of the use building, an indoor Total Volatile Organic compounds (TVOC) in the use building space of the use building, and an indoor Particulate Matter 2.5 (PM2.5) in the use building space of the use building. In some instances, the time stamped environmental data provided to the trained model pertaining to the use building space in the use building may include one or more of an outdoor $CO_2$ concentration, an outdoor temperature, an outdoor humidity, an outdoor Total Volatile Organic compounds (TVOC), and an outdoor Particulate Matter 2.5 (PM2.5).

Figure 7:
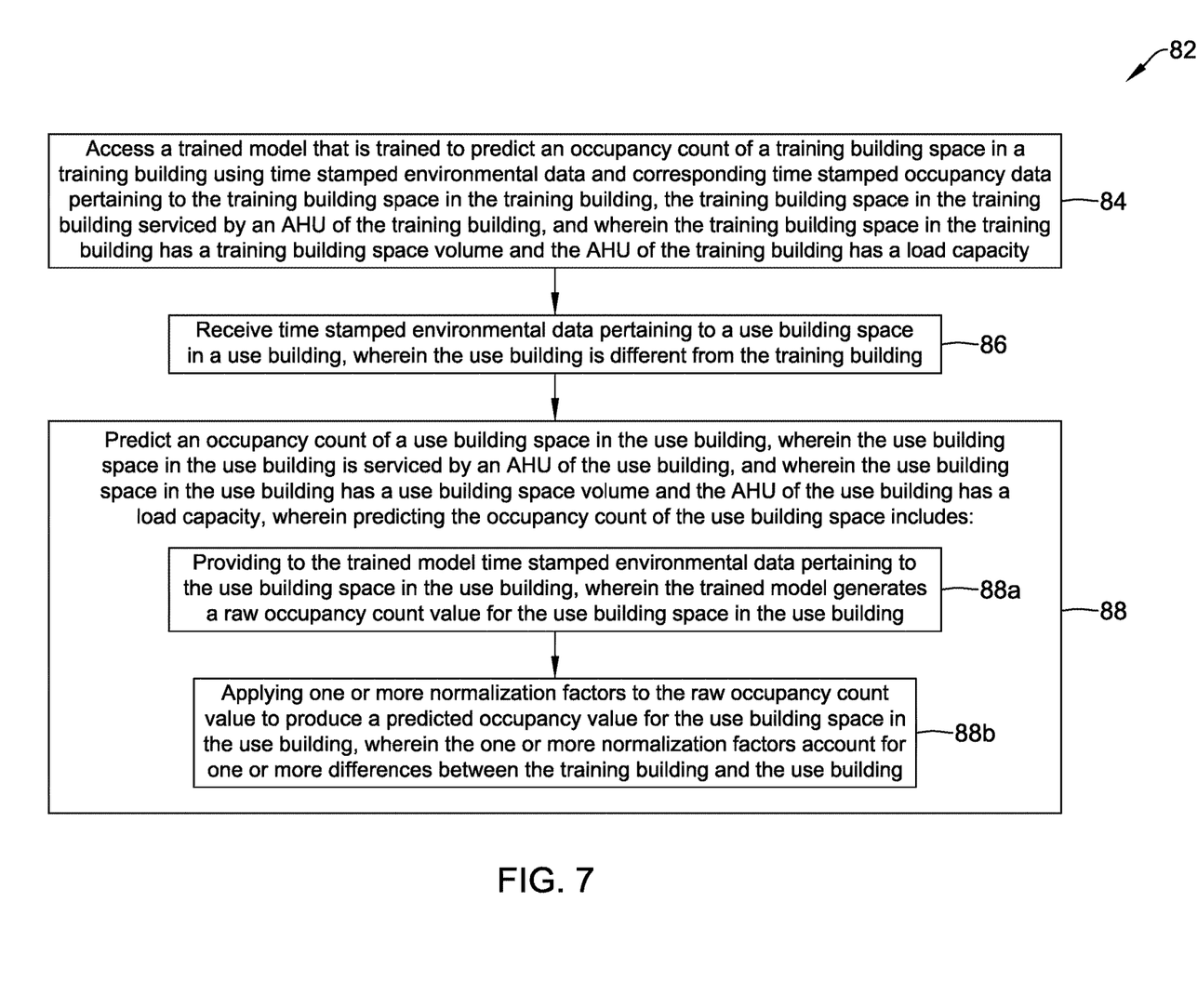
FIG. 7 is a flow diagram showing an illustrative method.

FIG. 7 is a flow diagram showing an illustrative series of steps 82 that may be carried out by one or more processors when the one or more processors execute executable instructions that are storable on a non-transient, computer-readable storage medium. The one or more processors may be part of the controller 28, for example. The one or more processors may be caused to access a trained model that is trained to predict an occupancy count of a training building space in a training building using time stamped environmental data and corresponding time stamped occupancy data pertaining to the training building space in the training building. The training building space in the training building is serviced by an AHU of the training building, and wherein the training building space in the training building has a training building space volume and the AHU of the training building has a load capacity, as indicated at block 84. The one or more processors may be caused to receive time stamped environmental data pertaining to a use building space in a use building, wherein the use building is different from the training building, as indicated at block 86.

The one or more processors may be caused to predict an occupancy count of the use building space in the use building, wherein the use building space in the use building is serviced by an AHU of the use building, and wherein the use building space in the use building has a use building space volume and the AHU of the use building has a load capacity, as indicated at block 88. Predicting the occupancy count of the use building space may include providing to the trained model the time stamped environmental data pertaining to the use building space in the use building, and in response, the trained model generates a raw occupancy count value for the use building space in the use building, as indicated at block 88a. Predicting the occupancy count of the use building space may include applying one or more normalization factors to the raw occupancy count value to produce a predicted occupancy value for the use building space in the use building, wherein the one or more normalization factors account for one or more differences between the training building and the use building, as indicated at block 88b.

In some cases, the one or more normalization factors may account for differences between the training building space volume of the training building space in the training building and the use building space volume of the use building space in the use building. The one or more normalization factors may account for maximum occupancy count differences between the training building space in the training building and the use building space in the use building. The one or more normalization factors may account for differences in the load capacity of the AHU servicing the training building space in the training building and the load capacity of the AHU servicing the use building space in the use building.

In some cases, the time stamped environmental data provided to the trained model pertaining to the use building space in the use building may include two or more of an indoor $CO_2$ concentration in the use building space of the use building, an indoor temperature in the use building space of the use building, a fresh air intake flow rate of the AHU of the use building space of the use building, an indoor humidity in the space of the use building use building, an indoor Total Volatile Organic compounds (TVOC) in the use building space of the use building, and an indoor Particulate Matter 2.5 (PM2.5) in the use building space of the use building.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for controlling one or more components of a Building Management System (BMS) of a use building in accordance with predicted occupancy of the use building, the predicted occupancy based upon a trained model, the method comprising:
training a model by:
providing the model with time stamped environmental data and corresponding time stamped occupancy data pertaining to a training building that is different from the use building, wherein the time stamped environmental data is derived from one or more environmental sensors of the training building and the corresponding time stamped occupancy data is derived from one or more occupancy sensors of the training building;
training the model over time using the time stamped environmental data and the corresponding time stamped occupancy data, resulting in a trained model;
employing the trained model in the use building, where employing the trained model in the use building comprises:
providing the trained model with time stamped environmental data pertaining to the use building, wherein the time stamped environmental data is derived from one or more environmental sensors of the use building;
receiving a raw occupancy count value produced by the trained model;
applying one or more normalization factors to the raw occupancy count value to produce a predicted occupancy value, wherein the one or more normalization factors account for one or more differences between the training building and the use building including one or more of:
a volumetric difference between the training building and the use building; and
a maximum occupancy count difference between the training building and the use building;
the trained model outputting the predicted occupancy value that represents a predicted occupancy count in the use building; and
operating the BMS of the use building based at least in part on the predicted occupancy value.

2. The method of claim 1, wherein the BMS of the use building and a BMS of the training building each have one or more Air handler Units (AHUs) each servicing a corresponding space, the method comprising:
training the model for a particular AHU of the training building with the time stamped environmental data and the corresponding time stamped occupancy data pertaining to the space of the training building serviced by the particular AHU of the training building;
applying the trained model to each of two or more AHUs of the use building, thereby outputting a predicted occupancy value for each of the spaces serviced by the two or more AHUs of the use building; and
aggregating the predicted occupancy value for each of the spaces serviced by the two or more AHUs of the use building to derive the predicted occupancy value for the use building.

3. The method of claim 2, further comprising:
applying one or more normalization factors to the predicted occupancy value for each of the spaces serviced by the two or more AHUs of the use building before aggregating the predicted occupancy value for each of the spaces serviced by the two or more AHUs of the use building to derive the predicted occupancy value for the use building, wherein the one or more normalization factors account for one or more of:
volumetric differences between the space serviced by the particular AHU of the training building and the space serviced by the corresponding AHU of the use building;
maximum occupancy count differences between the space serviced by the particular AHU of the training building and the space serviced by the corresponding AHU of the use building; and
differences in load capacity between the particular AHU of the training building and the corresponding AHU of the use building.

4. The method of claim 1, wherein the model comprises a regression machine learning model.

5. The method of claim 1, wherein the time stamped environmental data comprises two or more of:
an indoor $CO_2$ concentration;
an indoor temperature;
a fresh air intake flow rate of an AHU of the BMS;
an indoor humidity;
an indoor Total Volatile Organic compounds (TVOC); and
an indoor Particulate Matter 2.5 (PM2.5).

6. The method of claim 5, wherein the time stamped environmental data comprises one or more of:
an outdoor $CO_2$ concentration;
an outdoor temperature;
an outdoor humidity;
an outdoor Total Volatile Organic compounds (TVOC); and
an outdoor Particulate Matter 2.5 (PM2.5).

7. The method of claim 1, wherein the time stamped environmental data comprises two or more of outside air temperature, outside humidity, return air temperature, return air humidity, supply air temperature, supply air humidity, supply air static pressure and supply temperature setpoint.

8. A method for controlling one or more components of a Building Management System (BMS) of a use building in accordance with predicted occupancy of the use building, wherein the BMS of the use building and a BMS of the training building each have one or more Air handler Units (AHUs), the predicted occupancy based upon a trained model, the method comprising:
training a model by:
providing the model with time stamped environmental data and corresponding time stamped occupancy data pertaining to a training building that is different from the use building, wherein the time stamped environmental data is derived from one or more environmental sensors of the training building and the corresponding time stamped occupancy data is derived from one or more occupancy sensors of the training building;

training the model over time using the time stamped environmental data and the corresponding time stamped occupancy data, resulting in a trained model;

employing the trained model in the use building, where employing the trained model in the use building comprises:

providing the trained model with time stamped environmental data pertaining to the use building, wherein the time stamped environmental data is derived from one or more environmental sensors of the use building;

receiving a raw occupancy count value produced by the trained model;

applying one or more normalization factors to the raw occupancy count value to produce a predicted occupancy value, wherein the one or more normalization factors account for one or more differences between the training building and the use building including a difference in a load capacity between one or more of the AHUs of the training building and the use building;

the trained model outputting the predicted occupancy value that represents a predicted occupancy count in the use building; and operating the BMS of the use building based at least in part on the predicted occupancy value.

9. A method comprising:

storing a trained model that is trained to predict an occupancy count of a training building space in a training building using time stamped environmental data and corresponding time stamped occupancy data pertaining to the training building space in the training building, the training building space in the training building serviced by an Air Handling Unit (AHU) of the training building, and wherein the training building space in the training building has a training building space volume and the AHU of the training building has a load capacity;

predicting an occupancy count of a use building space in a use building, wherein the use building is different from the training building and the use building space in the use building is serviced by an AHU of the use building, and wherein the use building space in the use building has a use building space volume and the AHU of the use building has a load capacity, wherein predicting the occupancy count of the use building space includes:

providing to the trained model time stamped environmental data pertaining to the use building space in the use building, wherein the trained model generates a raw occupancy count value for the use building space in the use building;

applying one or more normalization factors to the raw occupancy count value to produce a predicted occupancy value for the use building space in the use building, wherein the one or more normalization factors account for one or more differences between the training building and the use building including one or more of:

a difference between the training building space volume of the training building space in the training building and the use building space volume of the use building space in the use building;

a maximum occupancy count differences between the training building space in the training building and the use building space in the use building;

a difference in the load capacity of the AHU servicing the training building space in the training building and the load capacity of the AHU servicing the use building space in the use building; and operating the AHU of the use building based at least in part on the predicted occupancy value for the use building space.

10. The method of claim 9, wherein the time stamped environmental data provided to the trained model pertaining to the use building space in the use building comprises two or more of:

an indoor $CO_2$ concentration in the use building space of the use building;

an indoor temperature in the use building space of the use building;

a fresh air intake flow rate of the AHU of the use building space of the use building;

an indoor humidity in the use building space of the use building;

an indoor Total Volatile Organic compounds (TVOC) in the use building space of the use building; and an indoor Particulate Matter 2.5 (PM2.5) in the use building space of the use building.

11. The method of claim 10, wherein the time stamped environmental data provided to the trained model pertaining to the use building space in the use building comprises one or more of:

an outdoor $CO_2$ concentration;

an outdoor temperature;

an outdoor humidity;

an outdoor Total Volatile Organic compounds (TVOC); and an outdoor Particulate Matter 2.5 (PM2.5).

12. The method of claim 10, wherein the trained model comprises a random forest machine learning model.

* * * * *